(12) United States Patent
Szadkowski et al.

(10) Patent No.: US 6,347,694 B1
(45) Date of Patent: Feb. 19, 2002

(54) BIASED WEAR SENSOR ASSEMBLY FOR SELF-ADJUSTING CLUTCH

(75) Inventors: Andrzej Szadkowski; Eric Frandsen; Ronald Morford, all of Southern Pines, NC (US)

(73) Assignee: ZF Meritor, LLC, Maxton, NC (US)

( * ) Notice: Subject to any disclaimer, the term of this patent is extended or adjusted under 35 U.S.C. 154(b) by 0 days.

(21) Appl. No.: 09/531,750

(22) Filed: Mar. 20, 2000

(51) Int. Cl.[7] ............................................... F16D 13/75
(52) U.S. Cl. ............... 192/30 W; 192/30 V; 192/111 A
(58) Field of Search ........................ 192/70.25, 111 A, 192/30 W, 30 V, 109 R

(56) References Cited

U.S. PATENT DOCUMENTS

| | | | |
|---|---|---|---|
| 5,238,093 A | | 8/1993 | Campbell |
| 5,595,036 A | * | 1/1997 | Gochenour et al. ...... 192/70.25 |
| 5,632,365 A | * | 5/1997 | Maucher ................. 192/70.25 |
| 5,595,275 A | * | 6/1997 | Gochenour et al. ...... 192/111 A |
| 5,690,203 A | * | 11/1997 | Link et al. .............. 192/70.25 |
| 5,904,233 A | * | 5/1999 | Hashimoto .............. 192/70.25 |
| 6,024,199 A | * | 2/2000 | Uenohara et al. ........ 192/70.25 |
| 6,062,365 A | * | 5/2000 | Gochenour .............. 192/70.25 |
| 6,079,537 A | * | 6/2000 | Hofmann et al. ........ 192/70.25 |
| 6,193,039 B1 | * | 2/2001 | Doremus et al. ........ 192/70.25 |

FOREIGN PATENT DOCUMENTS

| JP | 60-188628 | * | 9/1985 | ............. 192/70.25 |

* cited by examiner

Primary Examiner—Rodney H. Bonck
(74) Attorney, Agent, or Firm—Carlson, Gaskey & Olds

(57) ABSTRACT

A pin has an end secured to the pressure plate and the pin is disposed within a pressure plate hole for constraining the clutch cover and the pressure plate together for rotation about the rotational axis. A bushing is disposed within the hole and includes a bore for receiving the pin. The pin is received within the bore in an interference fit relationship while the bushing is permitted to move freely within the hole in the clutch cover. The pin moves within the bore in response to an adjustment force to accommodate wear of the clutch friction components. A resilient assembly absorbs vibrational force along the rotational axis to prevent misadjustment of the clutch. The resilient assembly is interposed between the bushing and the pressure plate to prevent the pin from moving along the bore in response to a vibrational force.

20 Claims, 2 Drawing Sheets

BIASED WEAR SENSOR ASSEMBLY FOR SELF-ADJUSTING CLUTCH

BACKGROUND OF THE INVENTION

This invention relates to an improved wear sensor assembly for a self-adjusting clutch, and more specifically, to a wear sensor assembly adopted to absorb vibrational forces and prevent misadjustment of the clutch.

Clutches are utilized in many vehicle drive applications to selectively transmit or break a drive connection between an engine and a transmission. In one common type of clutch that is widely utilized in heavy vehicles, a clutch includes a pressure plate that rotates with a clutch cover. A fulcrum selectively forces the pressure plate against a member that is to be driven to rotate with the pressure plate and clutch cover. When the pressure plate is forced against the driven member, it sometimes must move to accommodate wear on friction surfaces in the clutch. Wear adjustment is typically achieved by using a wear sensor assembly that senses the wear within the clutch. The wear sensor assembly cooperates with an adjustment assembly that adjusts the location of the clutch components relative to one another to maintain pedal travel parameters and proper operation of the clutch.

In one very standard way of sensing wear, at least one pin, typically four, is fixed to the pressure plate. A bushing is received in and located relative to the clutch cover, and the pin is located within the bushing. The pin and bushing cooperate with one another to adjust the position of the pressure plate relative to the cover in response to an adjustment force. However, vibrational forces may cause the pin and bushing to adjust the position of the pressure plate when adjustment is not needed or prevent proper adjustment. As a result, the clutch becomes misadjusted and may cause undesirable clutch operation. Therefore, what is needed is a wear sensor assembly that discriminates between adjustment forces and vibrational forces to prevent misadjustment of the clutch caused by vibrational forces.

SUMMARY OF THE INVENTION AND ADVANTAGES

The present invention provides a clutch that includes a pressure plate movable along a rotational axis for actuating a clutch member. A clutch cover is spaced from the pressure plate and includes a hole therethrough and spaced from the rotational axis. A pin has an end secured to the pressure plate and the pin is disposed within the hole for constraining the clutch cover and the pressure plate together for rotation about the rotational axis. A bushing is disposed within the hole and includes a bore for receiving the pin. In a preferred embodiment of the invention, the pin is received within the bore in an interference fit relationship while the bushing is permitted to move freely within the hole in the clutch cover. The pin moves within the bore in response to an adjustment force to accommodate wear of the clutch friction components. The present invention incorporates a resilient assembly to absorb vibrational force along the rotational axis to prevent misadjustment of the clutch. In the preferred embodiment, the resilient assembly is interposed between the bushing and the pressure plate to prevent the pin from moving along the bore in response to a vibrational force.

Accordingly, the above invention provides a wear sensor assembly that discriminates between adjustment forces and vibrational forces thereby preventing misadjustment of the clutch caused by vibrational forces.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
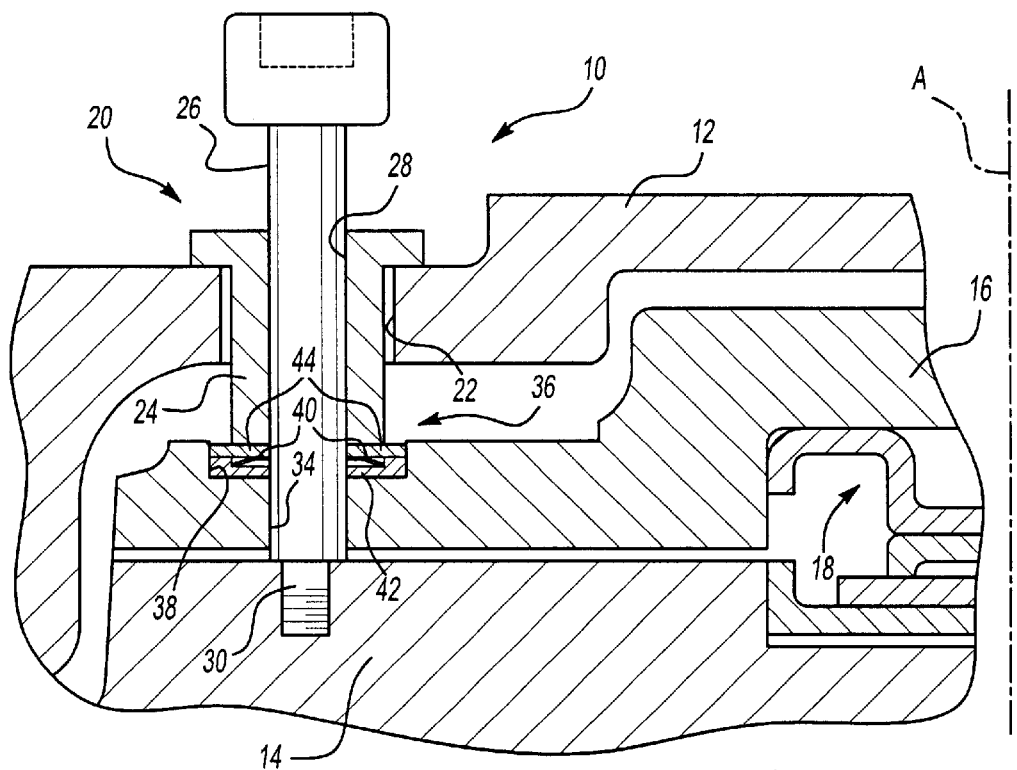
FIG. 1 is a cross-sectional view of one embodiment of the present invention wear sensor assembly.
Figure 2:
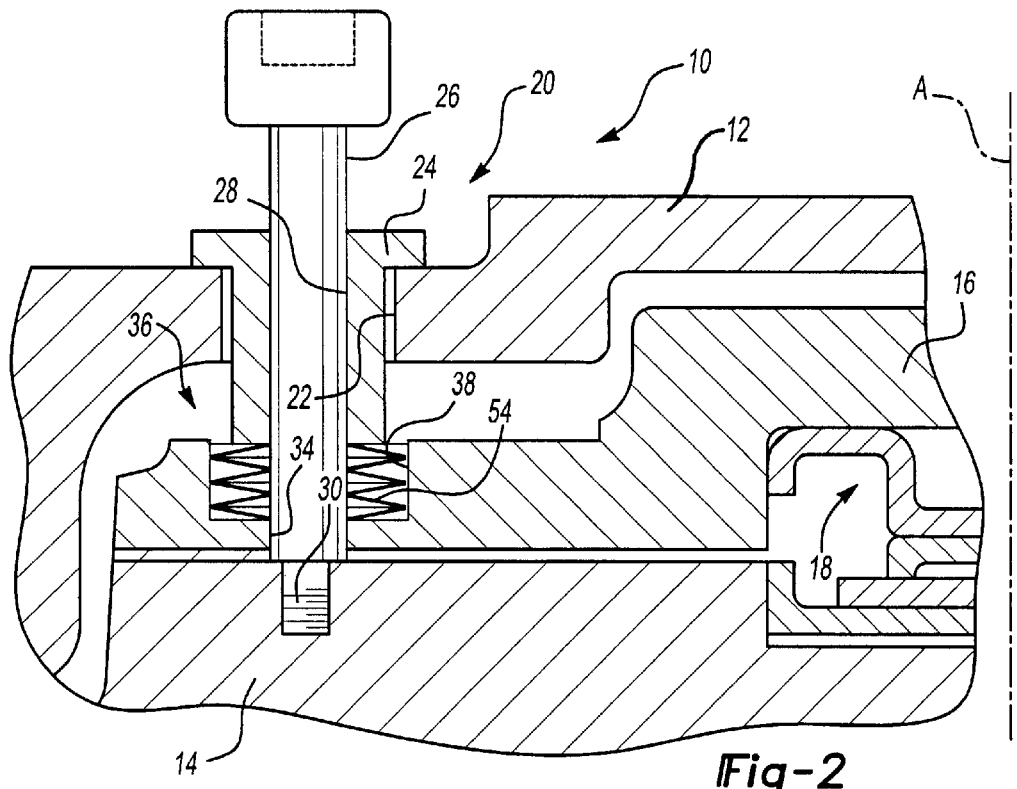
FIG. 2 is a cross-sectional view of another embodiment of the present invention wear sensor assembly.

A clutch 10 is shown in FIGS. 1 and 2 and includes a clutch cover 12. The clutch cover 12 is secured to a drive member which is typically a flywheel of an internal combustion engine. A friction plate is secured to an input shaft of a transmission, as is known in the art. A pressure plate 14 and fulcrum ring 16 are arranged between the cover 12 and the friction plate. The pressure plate 14 is movable along a rotational axis A toward the friction plate for actuating the clutch to couple the engine to the transmission by frictionally locking the pressure plate to the friction plate. A lever biases the pressure plate toward the friction plate so that the plates are normally engaged with one another.

During the life of the clutch 10 the clutch friction components wear thereby creating undesireable gaps between the components. To adjust the components and close the gaps, adjustment mechanisms have been developed. In one type of wear adjustment assembly, the fulcrum ring 16 and pressure plate 14 are movable rotationally relative to one another to adjust the pressure plate 14 along the axis A to accommodate wear in the pressure plate 14 and friction plate. A biasing member 18 rotationally biases the pressure plate 14 and fulcrum ring 16 in opposite directions about axis A. The surfaces between the pressure plate 14 and fulcrum ring 16 are ramped so that the pressure plate 14 moves away from the cover 12 to fill the gap between the pressure plate 14 and friction plate caused by wear of the members. In this manner, wear of the clutch components is accommodated to ensure proper operation of the clutch 10.

The clutch 10 has used a wear sensor assembly 20 that cooperates with the adjustment assembly to ensure that the pressure plate 14 is adjusted relative to the cover 12 only as the clutch components wear. Typically, four wear sensor assemblies 20 are disposed radially about the clutch 10. Each wear sensor assembly 20 responds to an adjustment force generated by the engagement of a worn clutch to adjust the position of the pressure plate 14. As discussed above, vibrational forces often cause undesired adjustment of the clutch by the wear sensor assembly, which results in misadjustment and improper clutch operation. Vibrational forces may also prevent the adjustment force from adjusting pressure plate 14.

The clutch cover 12 has a hole 22 therethrough that is spaced from the rotational axis A. The wear sensor assembly 20 includes a bushing 24 and a pin 26 disposed within a bore 28 in the bushing 24 to sense wear in the clutch components. The pin 26 has an end 30 secured to the pressure plate 14, and the bushing 24 is disposed within the hole 22. The pin 26 is disposed within the hole 22 for constraining the clutch cover 12 and the pressure plate 14 together for rotation about the rotational axis A. The pin 26 passes through an opening 34 in the fulcrum ring 16 that is large enough to permit relative rotation between the pressure plate 14 and fulcrum ring 16.

Using the preferred embodiment of wear sensor assemblies, shown in FIGS. 1 and 2, the bore 28 of the bushing 24 receives the pin 26 in an interference fit relationship. In this manner, the pin 26 travels with the bushing 24 during operation of the clutch 10 when the no adjustment is needed. The pin 26 is movable in the bore 28 such that the pin end 30 moves away from the clutch cover 12 relative to the bushing 24 when an adjustment force is applied to the pin 26 for accommodating wear in the clutch 10. The adjustment force is generated by the lever, which biases the pressure plate 14 toward the friction plate so that they are normally engaged. As a gap increases between the pressure plate 14 and the friction plate due to wear, the lever generates enough force to move the pin 26 through the bushing 24 approximately the distance of the gap to adjust for wear in the components.

Vibrational forces within the clutch 10 may cause an undesired adjustment, which may ultimately lead to misadjustment of the clutch 10. To prevent an undesired adjustment, the present invention utilizes a resilient assembly 36 arranged between the bushing 24 and the pressure plate 14. The resilient assembly 36 absorbs the vibrational force along the rotational axis A to prevent misadjustment of the clutch and ensure that the clutch only adjusts in response to adjustment forces generated by the lever. When the pressure plate 14 is subject to a vibration along the axis A, previously the vibration would generate a force that could pull the pin 26 through the bushing 24 and cause a clutch adjustment. With the present invention, the resilient assembly 36 absorbs the vibrational force.

The fulcrum ring 16 includes an annular recess 38 about the pin end 30 for receiving a portion of the bushing 24. The resilient assembly 36 is disposed within the annular recess 38. However, it is to be understood that the present invention does not require an annular recess 38. In the embodiment shown in FIG. 1, the resilient assembly 36 includes a convex annular disc 40 protruding toward the bushing 24. A stop washer 42 is interposed between the bushing 24 and the fulcrum ring 16 adjacent to the disc 40. Another washer 44 is arranged between the stop washer 42 and the bushing 24. The stop washer 42 and washer 44 cooperate to limit the deflection of the disc 40 and define the magnitude of vibrational force that will be absorbed. Said another way, the resilient assembly 36 is designed so to absorb forces that are less than the adjustment force, as explained in more detail below.

In the preferred embodiment shown in FIG. 2, the resilient assembly 36 includes a wave spring 54 interposed between the bushing 24 and the pressure plate 14. More specifically, the wave spring 54 is received in the annular recess 38 in the fulcrum ring 16.

Figure 3:
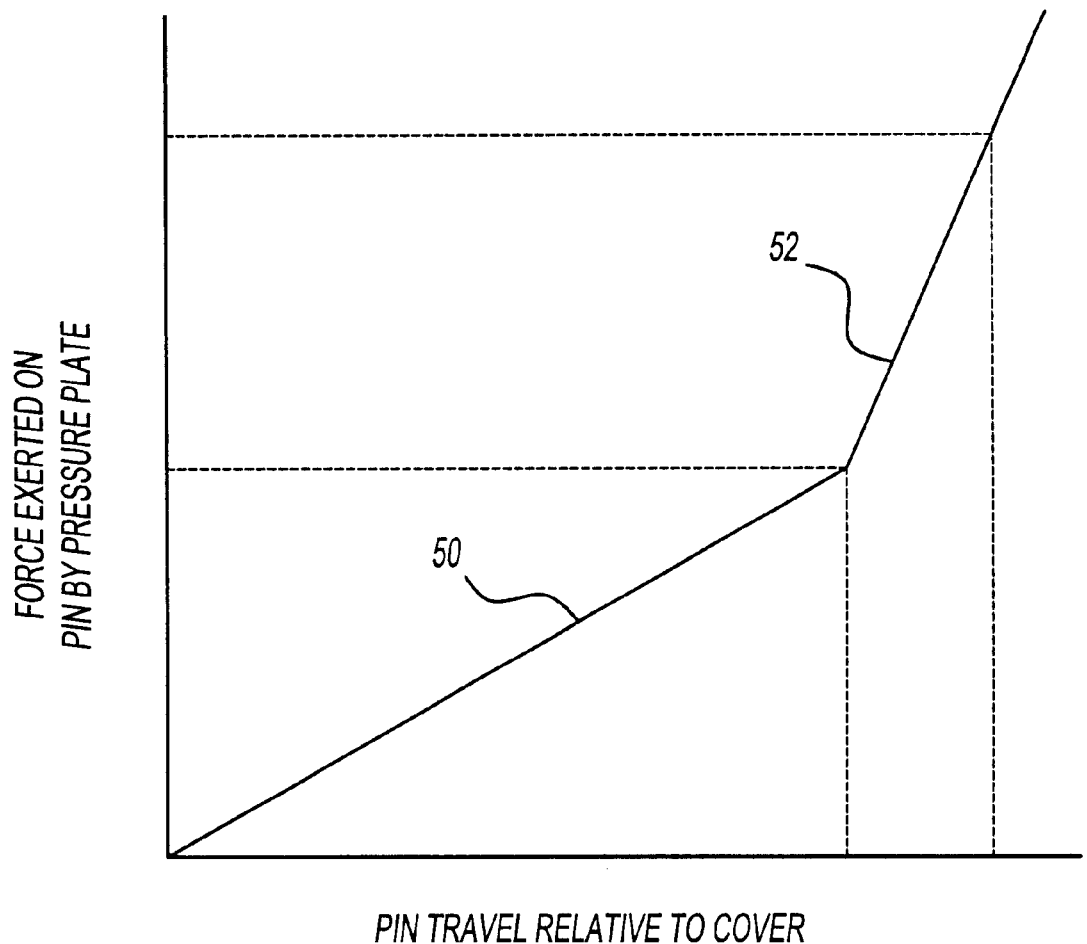
FIG. 3 is a graph of force exerted on a pin by pressure plate verses the pin travel relative to the cover.

The adjustment force is the amount of force required to overcome the interference fit and move the pin 26 through the bore 28. The amount of force needed to move the pin 26 and make a wear adjustment is typically greater than the vibrational force exerted on the pin 26. Assuming a steady force applied to the pin 26, the spring rates of the resilient assembly 36 and the pin 26 are generally linear. Referring to FIG. 3, the force exerted on pin 26 is shown versus the amount of pin 26 travel relative to the cover 12. As the resilient assembly 36 is compressed, the vibrational force is absorbed, shown by curve 50. When the resilient assembly 36 has reached the limits of compression, such as when the washer 44 abuts the stop washer 42 in the embodiment above, the pin 26 will move in the bore 28 when the force applied by the lever overcomes the interference fit, shown by curve 52. In this manner, the pin end 30 remains fixed relative to the bushing 24 in response to the vibrational force, that is, the pin 26 does not move within the bore 28.

The above invention may also be used for a wear sensor assembly in which the bushing is press fit into the hole in the cover. In this embodiment, the pin is free to move within the bushing bore, that is, the pin is slip fit within the bushing bore. With this type of arrangement, the resilient assembly may be arranged between the pin and the clutch cover.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A clutch comprising:

a pressure plate movable along a rotational axis for actuating a clutch member;

a clutch cover spaced from said pressure plate, said clutch cover having a hole therethrough and spaced from said rotational axis;

a pin having an end secured to said pressure plate and said pin being disposed within said hole for constraining said clutch cover and said pressure plate together for rotation about said rotational axis;

a bushing disposed within said hole, said bushing having a bore receiving said pin in an interference fit relationship; and a resilient assembly interposed between said bushing and said pressure plate, said resilient member absorbing a vibrational force along said rotational axis to prevent misadjustment of said clutch.

2. The clutch of claim 1, wherein said pin is movable in said bore such that said pin end moves away from said clutch cover relative to said bushing when an adjustment force is applied to said pin for accommodating wear in said clutch.

3. The clutch of claim 2, wherein said adjustment force is greater than said vibrational force, said pin end remaining fixed relative to said bushing in response to said vibrational force.

4. The clutch of claim 3, wherein said resilient assembly and said pin have spring rates that are generally linear.

5. The clutch of claim 1, wherein a fulcrum ring is interposed between said clutch cover, and said pressure plate, and said pin passes through an opening in said fulcrum ring with said fulcrum ring being adjustable relative to said pressure plate along said rotational axis.

6. The clutch of claim 5, wherein said fulcrum ring includes an annular recess about said pin end for receiving a portion of said bushing, said annular recess receiving said resilient assembly.

7. The clutch of claim 6, wherein said resilient assembly includes a wave spring interposed between said bushing and said fulcrum ring.

8. The clutch of claim 6, wherein said resilient assembly includes a convex annular disc protruding toward said bushing, and a stop washer interposed between said bushing and said fulcrum ring adjacent to said disc, wherein said stop washer limits deflection of said disc.

9. A method of adjusting a clutch comprising the steps of:

a) providing a pressure plate and a clutch cover spaced from the pressure plate with the clutch cover having a hole therethrough and a pin disposed therein and secured to the pressure plate, a bushing disposed within the hole with the bushing having a bore receiving the pin, and a resilient assembly interposed between the pressure plate and the bushing;

b) absorbing a vibrational force with the resilient assembly to prevent misadjustment of the clutch; and c) adjusting the clutch in response to an adjustment force to accommodate wear in the clutch by permitting the bushing to move relative to the pin to allow the pressure plate to move away from the cover.

10. The method of claim 9, wherein the adjustment force is greater than the vibrational force, the pin remaining fixed relative to the bushing in response to the vibrational force.

11. The method of claim 9, wherein the resilient assembly and the pin have spring rates that are generally linear.

12. A clutch comprising:

a pressure plate movable along a rotational axis for actuating a clutch member;

a clutch cover spaced from said pressure plate by a desired distance;

a first wear sensing member secured to said pressure plate and extending through a hole in said clutch cover for constraining said clutch cover and said pressure plate together for rotation about said rotational axis;

a second wear sensing member disposed within said hole, said first and said second wear sensing members movable relative to one another; and a resilient assembly interposed between one of said first and said second wear sensing members and one of said clutch cover and said pressure plate respectively, said resilient assembly absorbing a vibrational force along said rotational axis to prevent misadjustment of said clutch.

13. The clutch of claim 12, wherein said first wear sensing member comprises a pin having an end secured to said pressure plate and said pin being disposed within said hole, wherein said second wear sensing member comprises a bushing having a bore receiving said shaft in an interference fit relationship, and wherein said resilient assembly is interposed between said bushing and said pressure plate.

14. The clutch of claim 13, wherein said pin is movable in said bore such that said pin end moves away from said clutch cover relative to said bushing when an adjustment force is applied to said pin for accommodating wear in said clutch.

15. The clutch of claim 14, wherein said adjustment force is greater than said vibrational force, said pin end remaining fixed relative to said bushing in response to said vibrational force.

16. The clutch of claim 15, wherein said resilient assembly and said pin have spring rates that are generally linear.

17. The clutch of claim 13, wherein a fulcrum ring is interposed between said clutch cover, and said pressure plate, and said pin passes through an opening in said fulcrum ring with fulcrum ring being adjustable relative to said pressure plate along said rotational axis.

18. The clutch of claim 17, wherein fulcrum ring includes an annular recess about said pin end for receiving a portion of said bushing, said annular recess receiving said resilient assembly.

19. The clutch of claim 18, wherein said resilient assembly includes a wave spring interposed between said bushing and said fulcrum ring.

20. The clutch of claim 18, wherein said resilient assembly includes a convex annular disc protruding toward said bushing, and a stop washer interposed between said bushing and said fulcrum ring adjacent to said disc, wherein said stop washer limiting deflection of said disc.

* * * * *